United States Patent [19]

Vanderpool et al.

[11] Patent Number: 4,741,886

[45] Date of Patent: May 3, 1988

[54] PROCESS FOR RECOVERING TUNGSTEN FROM TUNGSTEN BEARING MATERIAL CONTAINING ARSENIC

[75] Inventors: Clarence D. Vanderpool; Richard A. Scheithauer; Martin B. MacInnis, all of Towanda, Pa.

[73] Assignee: GTE Products Corporation, Stamford, Conn.

[21] Appl. No.: 922,651

[22] Filed: Oct. 24, 1986

[51] Int. Cl.$^4$ .................................... C01G 41/00
[52] U.S. Cl. .................................... 423/55; 423/56; 423/57; 423/87; 210/729; 75/108; 75/101 R; 75/121
[58] Field of Search ............ 423/53, 54, 55, 56, 423/57, 87, DIG. 14; 75/1 R, 101 BE, 101 R, 108, 114, 115, 121; 210/702, 729, 734

[56] References Cited

U.S. PATENT DOCUMENTS 4,279,870  7/1981  Natansohn et al. ........ 423/DIG. 14
4,328,190  5/1982  Beckstead et al. ............ 75/101 BE
4,624,703  11/1986  Vanderpool et al. ............ 75/101 R

FOREIGN PATENT DOCUMENTS 0009193  1/1979  Japan ..................................... 423/54

Primary Examiner—Robert L. Stoll
Attorney, Agent, or Firm—Donald R. Castle; L. Rita Quatrini

[57] ABSTRACT

A process is disclosed for recovering tungsten from tungsten bearing material containing arsenic. The process involves adjusting a water slurry of the material to a pH of less than about 4 with an acid to solubilize the major portion of the tungsten, adding an insoluble ferric compound to the slurry to form a two phase system in which the solid phase contains the major portion of the arsenic and of any phosphorus which may be present, and a solution phase containing the major portion of the tungsten. After separation of the solid from the solution, the solution is adjusted to a pH of less than about 2 with an acid and a suffficient amount of hexamethylenetetramine is added to the solution to precipitate the major portion of the tungsten, followed by separating the precipitate from the resulting liquor. The solid phase containing the arsenic and phosphorus, if any, can be contacted with water and a soluble ferric salt to produce a treated solid which passes the EP toxicity test.

6 Claims, No Drawings

PROCESS FOR RECOVERING TUNGSTEN FROM TUNGSTEN BEARING MATERIAL CONTAINING ARSENIC

This invention relates to a process for recovering tungsten from tungsten bearing material containing arsenic. It also relates to a process for rendering the resulting tungsten depleted material non-toxic with respect to arsenic.

BACKGROUND OF THE INVENTION

When tungsten ores such as scheelite, wolframite, or hubnerite are digested to recover the tungsten, elements other than tungsten present in the ores are also removed. For instance, most ore types contain molybdenum, silica, phosphorus, arsenic, antimony, and some tin. If these elements are allowed to remain with the tungsten, they will in later processing steps cause high losses of tungsten by formation of heteropoly tungstates which are soluble. These heteroploy tungstates are also soluble in organic solvents. In organic/aqueous solvent extraction processing, this results in formation of a third phase or slow separation of the organic and aqueous phases. For all practical purposes, the silicon, arsenic, and phosphorus must be removed if tungsten is to be recovered with little loss.

To remove these elements, the industry uses a modified version of the analytical procedure. This is the formation of ammonium magnesium arsentate or phosphate, which can be filtered out of the tungsten solution. The caustic digestion of tungsten ores produces a solution of sodium tungstate, sodium molybdate, sodium phosphate, sodium silicate, and sodium arsenate. To this solution is added ammonium hydroxide, or ammonium chloride and magnesium sulfate or magnesium cloride. The pH of this solution is about 12.0 and is lowered to from about 9.0 to about 9.5. This causes precipitation of the silicon as silicon dioxide, and arsenic and phosphorus as their respective ammonium salts. These are all filtered off. There are significant amounts of tungsten entrapped or occluded in this precipitate also. This precipitate can contain by weight up to about 25% tungsten, about 5% arsenic, from about 1.7% to about 2.0% phosphorus, about 10.0% silicon, and about 10% magnesium. Such precipitates present a disposal problem because the arsenic content makes it a toxic material.

One present method for removing some of the tungsten from this type of material is simply by washing with water, However, only the soluble tungsten is removed in this way. The insoluble tungsten remains in the material and the material is still toxic.

Another method for removing tungsten from this type of material is digesting the material in strong sodium hydroxide. This removes the tungsten but also removes a significant portion of the arsenic and phosphorus.

SUMMARY OF THE INVENTION

In accordance with one aspect of this invention, there is provided a process for recovering tungsten from tungsten bearing material containing arsenic. The process involves adjusting a water slurry of the material to a pH of less than about 4 with an acid to solubilize the major portion of the tungsten, adding an insoluble ferric compound to the slurry to form a two phase system in which the solid phase contains the major portion of the arsenic and of any phosphorus which may be present, and a solution phase containing the major portion of the tungsten. After separation of the solid from the solution, the solution is adjusted to a pH of less than about 2 with an acid and a sufficient amount of hexamethylenetetramine is added to the solution to precipitate the major portion of the tungsten, followed by separating the precipitate from the resulting liquor.

In accordance with another aspect, the solid phase containing the arsenic and phosphorus, if any, can be contacted with water and a soluble ferric salt to produce a treated solid which passes the EP toxicity test.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

This invention provides a method for recovering tungsten from tungsten bearing material containing arsenic and for rendering the material non-toxic with respect to arsenic.

The starting material can be essentially any type of tungsten material containing arsenic. The most typical source of the starting material is the sludge resulting from caustic digestion of tungsten ores. This material typically contains by weight up to about 25% tungsten, about 5% arsenic, about 2% phosphorus, about 10% silicon, and about 10% magnesium.

The starting material is first slurried in water. The amount of water used should be sufficient to producee a slurry which can be agitated but not in an excess amount to dilute the soluble tungsten to levels impractical to recover it later. Typically the slurry is made up of about 1 weight part of material to about 2 weight parts of water.

When the material is well dispersed in the water, the pH of the slurry which is preferbly heated to a temperature of from about 80° C. to about 95° C. is adjusted to less than about 4 and preferably from about 3.6 to about 4.0 with an acid, preferably with dilute sulfuric acid. It is preferred to use dilute acid, for example, from about 1N to about 3N sulfuric acid, because if the acid is too concentrated, localized irreversible formation of insoluble tungsten acid occurs and recovery of tungsten is less efficient. In this pH range the tungsten is in the metatungsten form and the major portion of the tungsten is therefore soluble.

An insoluble ferric compound is then added to the resulting pH adjusted slurry. This results in formation of a two phase system consisting essentially of a solid phase containing the major portion of the starting arsenic, and any phosphorus and silica which may be present along with the insoluble ferric compound, and a soluble phase containing the major portion of the starting tungsten which is usually about 95% by weight. The preferred insoluble ferric compound is ferric hydroxide. The ferric hydroxide adsorbs the arsenic and phosphorus.

It is essential that the ferric compound be insoluble. Use of a soluble ferric compound as ferric sulfate results in loss of relatively large amounts of tungsten, such as about 20%, from the solution. The insoluble ferric compound such as ferric hydroxide, adsorbs the arsenic without any appreciable tungsten. It is especially preferred that the ferric hydroxide that is used be freshly precipitated because in this condition it adsorbs more arsenic than otherwise.

A preferred method of carrying out the step of adding the insoluble ferric compound is to first dissolve ferric sulfate in water and adjust the pH to form about 9 to about 10 with a base. Ammonium hydroxide is the preferred base because it does not introduce contaminating cations and the ammonium is compatible for the subsequent recovery of tungsten as an ammonium tungstate species. The resulting precipitate of ferric hydroxide is separated from the resulting liquor by any standard technique such as filtration. The ferric hydroxide is then added to the pH adjusted slurry as described above.

After addition of the insoluble ferric compound to the slurry, the slurry is agitated preferably at room temperature. The pH of the resulting feric compound treated is in the range of from about 5 to about 6.

The resulting solid phase is then separated from the solution phase by any standard technique such as filtration.

The solution phase is now processed to recover the tungsten as follows. The pH of the solution phase is adjusted to less than about 2.0 and preferably to less than about 1 with an acid preferably dilute sulfuric acid. A sufficient amount of hexamethylenetetramine is then added to the resulting pH adjusted solution to form a precipitate containing the major portion of the tungsten which is in the solution. Generally about 1.5 weight parts of hexamethylenetetramine is added per weight part of tungsten. The resulting hexamethylenetetramine-treated solution is then cooled preferably to room temeprature if necessary. Precipitation of tungsten in this manner results in separating the tungsten from magnesium and essentially any other impurities which may be present in the solution phase.

The precipitate is then separated from the resulting mother liquor by any standard technique such as filtration.

The tungsten containing precipitate can be processed by standard techniques to recover the tungsten for practical use. For example, the precipitate can be dried and then fired into tungstic oxide at about 750° C. A typical weight analysis of such tungstic oxide is about 75% W, about 0.26% As, about 0.08% P, about 1.3% Si, and about 0.69% Mg.

The solid phase containing the insoluble iron compound with the major portion of the starting arsenic and phosphorus (if phosphorus is present adsorbed onto it, can then be contacted with water and a soluble ferric salt to produce a treated solid wherein the arsenic and any phosphorus are in a condition which results in a leachate containing less than about 5 mg As/l when the EP Toxicity test procedure outlined in the Federal Register, Volume 45, No. 98, May 19, 1980, Appendix II, pages 33127 and 33128 is performed on the treated solid. The leaching solution in this test is 0.5N acetic acid. The solid is mixed with this solution for about 24 hours and filtered off. The resulting leachate is analyzed for arsenic. when the treated solid of this invention is subjected to this test, the leachate most typically contains less than about 1 mg As/l. The arsenic is therefore considered to be non-toxic. A soluble ferric salt is critical because if an insoluble ferric compound is used in this step, the arsenic remaining in the leachate from the EP test will be higher and the material will not pass the EP test.

The above described process has the following features: (1) removing As and P from tungsten solution with ferric hydroxide without precipitating significant amounts of tungsten, (2) forming a compound of hexamethylenetetramine with tungsten which results in separating tungsten from the major portion of any magnesium, arsenic and phosphorus which may be present in the tungsten solution, (4) addition of a ferric salt to the As and P containing material to make then insoluble in the EP leachate test, and therefore non-toxic.

To more fully illustrate this invention, the following nonlimiting example is presented. All parts, portions, and percentages are by weight unless otherwise stated.

EXAMPLE

About 400 parts of wet tungsten bearing material from caustic digestion of tungsten ores is slurried in 800 parts of water. After the material is well dispersed, the pH is adjusted to about 3.25 with dilute sulfuric acid. The solution phase of the resulting pH adjusted slurry at this point contains about 50.0 g W/l, about 0.99 g As/l, about 1.05 g P/l, about 0.85 g Si/l, and about 7.9 g Mg/l. In another container about 50 parts of $Fe_2(SO_4)_3$ is dissolved in about 500 parts of water and the pH is adjusted to about 9.55 with ammonium hydroxide. The solid ferric hydroxide precipitate is filtered off and then added to the above slurry. After the ferric hydroxide is added to the above tungsten slurry, the solution is agitated for about 1 hour at room temperture. The pH of the resulting ferric hydroxide treated solution is about 5.40. The resulting ferric hydroxide, undissolved silicon dioxide, and adhered impurities are then removed from the solution by filtration. The resulting filtrate contains about 49.2 g W/l, about 0.21 g As/l, no detectable P, about 0.62 g Si/l, and about 8.28 g Mg/l. The above analysis shows that about 1.6% of the tungsten is lost from the solution. If a soluble ferric salt were used, the loss of tungsten would be about 20% or more. The analysis shows that the major portion of the arsenic is removed from the tungsten with very little loss of tungsten. The pH of the above solution containing most of the tungsten is adjusted to about 0.85 with dilute sulfuric acid and about 50 parts of hexamethylenetetramine is added. The resulting mixture is cooled to room temperature, that is, about 25° C. The white precipitate of tungsten hexamethylenetetramine is filtered off, dried, and fired to tungstic oxide at about 750° C. The tungstic oxide contains about 75% W, about 0.26% As, about 0.08% P, about 1.3% Si, and about 0.69% Mg and is suitable for further processing. The recovery of tungsten is about 82.05%. The filtrate from the precipitation of tungsten hexamethylenetetramine contains about 0.32 g W/l, about 0.03 g As/l, no detectable phosphorus, about 0.09 g Si/l, and about 6.3 g Mf/l. This is a disposable waste. The ferric hydroxide and silicon dioxide precipitate with adsorbed As and P is slurried in about 500 parts of water with about 50 parts of ferric sulfate, a soluble ferric salt. The resulting treated solid material passes the previously described EP test at less than about 1 mg As/l in the leachate.

While there has been shown and described what are at present considered the preferred embodiments of that invention, it will be obvious to those skilled in the art that various changes and modifications may be made therein without departing from the scope of the invention as defined by the appended claims.

What is claimed is:

1. A process for recovering tungsten from tungsten bearing material containing arsenic, said process comprising:
   (a) adjusting a water slurry of said material to a pH of less than about 4 with an acid to solubilize the major portion of the tungsten;
   (b) adding to the resulting pH adjusted slurry a ferric compound capable of adsorbing arsenic without adsorbing appreciable amounts of tungsten, and insoluble in said pH adjusted slurry at a pH of less than about 4, to form a two phase system consisting essentially of a solid phase containing the major portion of said arsenic and of any phosphorus which may be present, and a solution phase contianing the major portion of the tungsten;
   (c) separating said solid phase from said solution phase;
   (d) adjusting the pH of said solution phase to less than about 2 with an acid;
   (e) adding hexamethylenetetramine to the resulting pH adjusted solution phase in an amount sufficient to form a precipitate containing the major portion of the tungsten which is in said solution; and
   (f) separating said precipitate from the resulting mother liquor.

2. A process of claim 1 wherein the pH of said slurry is adjusted to from about 3.6 to about 4.0.

3. A process of claim 1 wherein said insoluble ferric compound is ferric hydroxide.

4. A process of claim 3 wherein said ferric hydroxide is freshly precipitated.

5. A process of claim 1 comprising the additional step of contacting said solid phase containing the major portion of said arsenic with water and a water soluble ferric salt to produce a treated solid wherein said major portion of said arsenic is in a condition which results in a leachate containing less than about 5 mg As/l.

6. A process of claim 5 wherein said ferric salt is ferric sulfate.

* * * * *